United States Patent
Lee et al.

(10) Patent No.: US 9,945,386 B2
(45) Date of Patent: Apr. 17, 2018

(54) REAL TIME ROTATION BREAKAWAY DETECTION

(71) Applicant: SOLAR TURBINES INCORPORATED, San Diego, CA (US)

(72) Inventors: David Tai Wai Lee, Singapore (SG); Kwok-Kwong Ben Tse, San Diego, CA (US); Kenneth Gregory Thomas, San Diego, CA (US); Ching Kai Chan, Singapore (SG); Jorge Hernandez-Maldonado, San Diego, CA (US)

(73) Assignee: Solar Turbines Incorporated, San Diego, CA (US)

( * ) Notice: Subject to any disclaimer, the term of this patent is extended or adjusted under 35 U.S.C. 154(b) by 147 days.

(21) Appl. No.: 15/041,347

(22) Filed: Feb. 11, 2016

(65) Prior Publication Data
US 2017/0234320 A1    Aug. 17, 2017

(51) Int. Cl.
*F04D 27/00*    (2006.01)
*G01M 15/14*    (2006.01)
*F04D 29/32*    (2006.01)

(52) U.S. Cl.
CPC ......... *F04D 27/001* (2013.01); *F04D 29/321* (2013.01); *G01M 15/14* (2013.01); *F05B 2220/302* (2013.01); *F05B 2260/83* (2013.01)

(58) Field of Classification Search
CPC .... F04D 27/001; F04D 29/321; G01M 15/14; F05B 2260/83; F05B 2220/302

USPC ................. 416/223 A; 73/660–661
See application file for complete search history.

(56) References Cited

U.S. PATENT DOCUMENTS

| | | | |
|---|---|---|---|
| 3,313,927 A | 4/1967 | Raike et al. | |
| 3,346,771 A | 10/1967 | Sutton | |
| 4,080,823 A * | 3/1978 | Stargardter | G01H 1/006 73/655 |
| 4,169,438 A * | 10/1979 | Iwase | F02P 5/15 123/406.63 |
| 4,573,358 A * | 3/1986 | Luongo | G01H 1/006 73/660 |

(Continued)

FOREIGN PATENT DOCUMENTS

| | | |
|---|---|---|
| CN | 1033334830 A | 10/2013 |
| CN | 103527319 A | 1/2014 |

(Continued)

*Primary Examiner* — Peter Macchiarolo
*Assistant Examiner* — Anthony W Megna Fuentes
(74) *Attorney, Agent, or Firm* — Procopio, Cory, Hargreaves & Savitch LLP; James R. Smith

(57) ABSTRACT

A system and method for detecting the rotation breakaway of a spacer from a compressor rotor disk are disclosed herein. The method includes detecting a disk sensed feature and a spacer sensed feature on the compressor rotor disk and the spacer respectively. The method also includes comparing the timing between the two to a predetermined threshold to determine whether the relative position of the spacer to the compressor rotor disk exceeds a predetermined amount. The predetermined amount may be selected to determine whether an imbalance, rubbing, or binding can occur in the gas turbine engine or to determine whether anti-rotation features have been broken.

19 Claims, 5 Drawing Sheets

(56) References Cited

U.S. PATENT DOCUMENTS

| | | | |
|---|---|---|---|
| 5,097,711 A * | 3/1992 | Rozelle | G01H 1/006 |
| | | | 73/660 |
| 5,533,409 A | 7/1996 | Crane et al. | |
| 6,140,952 A | 10/2000 | Gaboury | |
| 6,334,474 B1 | 1/2002 | Rababy et al. | |
| 6,928,818 B1 | 8/2005 | Arnold et al. | |
| 6,941,822 B2 | 9/2005 | Yao | |
| 8,505,364 B2 | 8/2013 | Batzinger et al. | |
| 8,740,224 B2 | 6/2014 | Zheng et al. | |
| 2004/0227645 A1 | 11/2004 | Lujan et al. | |
| 2008/0206057 A1* | 8/2008 | Twerdochlib | G01H 1/006 |
| | | | 416/190 |
| 2009/0256556 A1* | 10/2009 | Eberl | F01D 5/141 |
| | | | 324/207.25 |
| 2015/0002143 A1* | 1/2015 | Nishimizu | G01B 7/16 |
| | | | 324/207.25 |

FOREIGN PATENT DOCUMENTS

| | | |
|---|---|---|
| EP | 0180342 A | 5/1986 |
| JP | 2013224847 A | 10/2013 |
| WO | 94/14577 | 7/1994 |
| WO | 2010115502 A | 10/2010 |

* cited by examiner

REAL TIME ROTATION BREAKAWAY DETECTION

TECHNICAL FIELD

The present disclosure generally pertains to gas turbine engines, and is more particularly directed toward rotation breakaway detection of compressor spacers.

BACKGROUND

Gas turbine engines include compressor, combustor, and turbine sections. Components of the gas turbine engine sections are subject to high temperatures and pressures. These temperatures and pressures may vary during transients of the gas turbine engine, especially during start up and shut down of the gas turbine engine. The components may thermally expand at different rates resulting in a loss of pilot between components and thermal stresses and strains within components.

U.S. Pat. No. 5,533,409 to Crane, et al. discloses an angular motion detector, of particular relevance in breakaway point detection, includes a flywheel rotatably mounted on a spindle. The flywheel is provided with one or more indicia, which are detectable by a sensor situated on the object whose angular motion is to be analyzed. The sensor is connected to a microprocessor. In use the flywheel is rotated manually about the spindle so that the regular detection of the indicia by the sensor causes a train of pulses to be sent to the microprocessor. Angular movement of the object, and consequently of the sensor, causes a disruption of the pulse train which can be analyzed to provide information relating to the time of first movement and the magnitude of the angle moved.

The present disclosure is directed toward overcoming one or more of the problems discovered by the inventors.

SUMMARY OF THE DISCLOSURE

A method for detecting the rotation breakaway of a spacer from a compressor rotor disk of a gas turbine engine is disclosed herein. The method includes a rotor sensor detecting a disk sensed feature located on the compressor rotor disk and a spacer sensor detecting a spacer sensed feature located on the spacer. The method also includes the rotor sensor outputting a rotor sensor output signal and the spacer sensor outputting a spacer sensor output signal. The method further includes the signal conditioner receiving the rotor sensor output signal and the spacer sensor output signal. The method yet further includes the signal conditioner converting the rotor output signal to a disk conditioned signal and the spacer output signal to a spacer conditioned signal including filtering the noise from the rotor sensor output signal and the spacer output signal. The method still further includes the signal conditioner outputting the disk conditioned signal and the spacer conditioned signal.

The method also includes the offset determinator receiving the disk conditioned signal and the spacer conditioned signal. The method further includes the offset determinator determining whether the spacer is offset relative to the disk by a predetermined amount by comparing the timing of the disk conditioned signal and the spacer conditioned signal. The method yet further includes the offset determinator outputting a comparison signal. The method still further includes the memory receiving the comparison signal and storing that an offset has occurred when a change in the comparison signal is received. The method also includes the outputter obtaining a value from the memory of whether an offset has occurred. The method further includes the outputter sending an output signal to an output device when a change has occurred.

A rotation breakaway detection system for detecting a misalignment of a spacer and a compressor rotor disk for a gas turbine engine compressor is also disclosed. The spacer includes a spacer sensed feature and the compressor rotor disk including a disk sensed feature. In embodiments, the rotation breakaway detection system includes a rotor sensor, a spacer sensor, a signal conditioner, an offset determinator, a memory and an outputter. The rotor sensor detects the disk sensed feature when the compressor rotor disk is rotating and outputs a rotor sensor signal including a first pulse each time the disk sensed feature is detected. The spacer sensor detects the spacer sensed feature when the spacer is rotating and outputs a spacer sensor signal including a second pulse each time the spacer sensed feature is detected.

The signal conditioner receives the rotor sensor signal and the spacer sensor signal, and conditions the rotor output signal and the spacer output signal by adjusting the timing of the rotor output signal and the spacer output signal so that the first pulse and the second pulse are aligned when the compressor rotor disk and the spacer are in an initial state and converting the rotor output signal to a disk conditioned signal and the spacer output signal to a spacer conditioned signal. The signal conditioner outputs the disk conditioned signal including a first conditioned pulse correlating to the first pulse and the spacer conditioned signal including a second conditioned pulse correlating to the second pulse.

The offset determinator receives the disk conditioned signal and the spacer conditioned signal, determines whether an offset between the spacer and the compressor rotor disk has occurred by comparing the timing between the first conditioned pulse and the second conditioned pulse to a predetermined threshold, and outputs a comparison signal, changing the output of the comparison signal when the timing between the first conditioned pulse and the second conditioned pulse exceeds the predetermined threshold. The memory receives the comparison signal and stores that an offset has occurred when a change in the comparison signal is received. The outputter obtains a value from the memory of whether the offset has occurred and sends an output signal to an output device when a change has occurred.

DETAILED DESCRIPTION

The systems and methods disclosed herein include a rotation breakaway detection system for detecting any relative changes in the circumferential direction between a compressor rotor disk and a spacer for a compressor of a gas turbine engine. In embodiments, the rotation breakaway detection system may be used in conjunction with a gas turbine engine or a spin pit to detect a relative positional change beyond a threshold amount. The rotation breakaway detection system can be used to prevent damage to a gas turbine engine or can be used to test compressor rotor disk and spacer configurations including configurations of anti-rotation features used to prevent relative displacement between the spacers and the compressor rotor disks.

Figure 1:
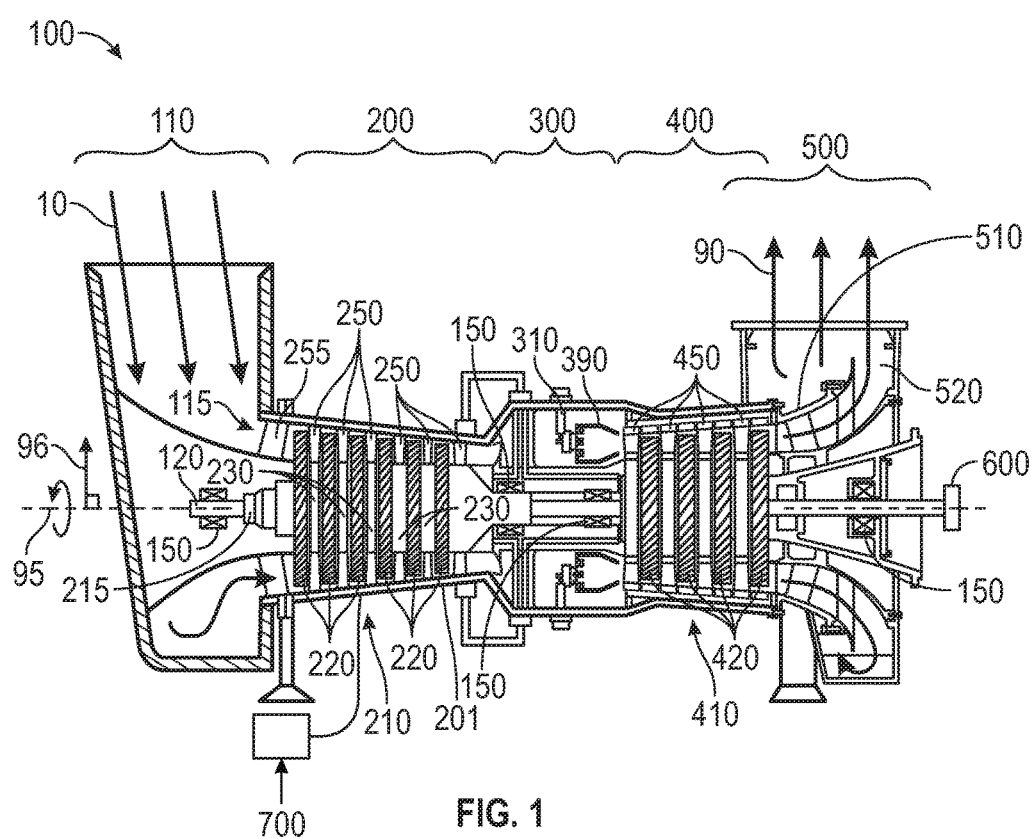
FIG. 1 is a schematic illustration of an exemplary gas turbine engine.

FIG. 1 is a schematic illustration of an exemplary gas turbine engine. Some of the surfaces have been left out or exaggerated (here and in other figures) for clarity and ease of explanation. Also, the disclosure may reference a forward and an aft direction. Generally, all references to "forward" and "aft" are associated with the flow direction of primary air (i.e., air used in the combustion process), unless specified otherwise. For example, forward is "upstream" relative to primary air flow, and aft is "downstream" relative to primary air flow.

In addition, the disclosure may generally reference a center axis 95 of rotation of the gas turbine engine, which may be generally defined by the longitudinal axis of its shaft 120 (supported by a plurality of bearing assemblies 150). The center axis 95 may be common to or shared with various other engine concentric components. All references to radial, axial, and circumferential directions and measures refer to center axis 95, unless specified otherwise, and terms such as "inner" and "outer" generally indicate a lesser or greater radial distance from, wherein a radial 96 may be in any direction perpendicular and radiating outward from center axis 95.

A gas turbine engine 100 includes an inlet 110, a shaft 120, a gas producer or "compressor" 200, a combustor 300, a turbine 400, an exhaust 500, and a power output coupling 600. The gas turbine engine 100 may have a single shaft or a dual shaft configuration.

The compressor 200 includes a compressor rotor assembly 210, compressor stationary vanes ("stators") 250, and inlet guide vanes 255. The compressor rotor assembly 210 mechanically couples to shaft 120. As illustrated, the compressor rotor assembly 210 is an axial flow rotor assembly. The compressor rotor assembly 210 includes one or more compressor disk assemblies 220 and one or more spacers 230. Each compressor disk assembly 220 includes a compressor rotor disk 221 that is circumferentially populated with compressor rotor blades 227 (Refer to FIG. 3). In embodiments, each spacer 230 extends between the rims 222 of adjacent compressor rotor disk assemblies 220 (Refer to FIG. 3). Stators 250 axially follow each of the compressor disk assemblies 220. Each compressor disk assembly 220 paired with the adjacent stators 250 that follow the compressor disk assembly 220 is considered a compressor stage. Compressor 200 includes multiple compressor stages. Inlet guide vanes 255 may axially precede the first compressor stage.

The combustor 300 includes one or more injectors 310 and includes one or more combustion chambers 390.

The turbine 400 includes a turbine rotor assembly 410, and turbine nozzles 450. The turbine rotor assembly 410 mechanically couples to the shaft 120. As illustrated, the turbine rotor assembly 410 is an axial flow rotor assembly. The turbine rotor assembly 410 includes one or more turbine disk assemblies 420. Each turbine disk assembly 420 includes a turbine disk that is circumferentially populated with turbine blades. A turbine nozzle 450 axially precedes each of the turbine disk assemblies 420. Each turbine disk assembly 420 paired with the adjacent turbine nozzle 450 that precedes the turbine disk assembly 420 is considered a turbine stage. Turbine 400 includes multiple turbine stages.

The exhaust 500 includes an exhaust diffuser 510 and an exhaust collector 520.

The gas turbine engine 100 also includes a rotation breakaway detection system 700. The rotation breakaway detection system 700 is configured to determine when a compressor spacer 230 rotates relative to an adjacent compressor rotor disk 221 and to alert an operator, engineer, or owner of the gas turbine engine 100.

Figure 2:
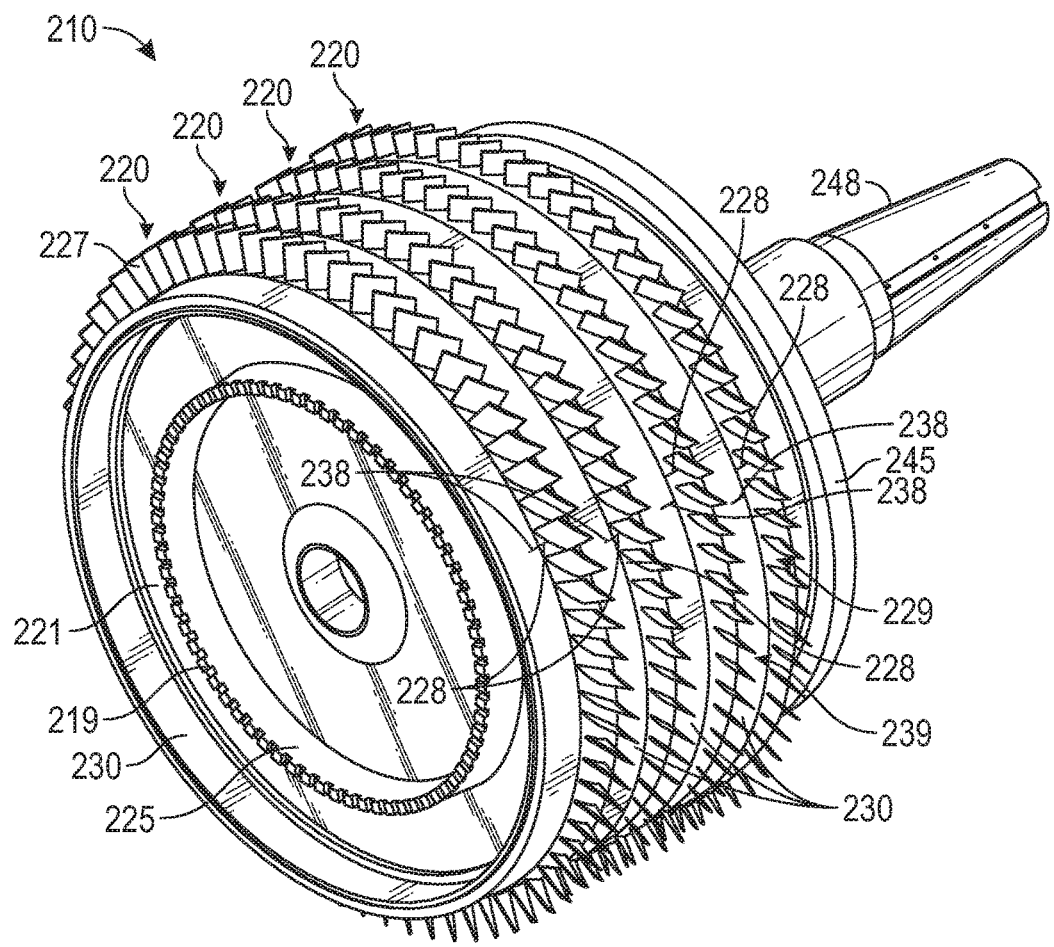
FIG. 2 is a perspective view of an aft portion of the compressor rotor assembly of FIG. 1.

FIG. 2 is a perspective view of an aft portion of the compressor rotor assembly 210 of FIG. 1. The compressor rotor assembly 210 includes compressor disk assemblies 220, spacers 230, and rear hub 245. Each compressor disk assembly 220 includes a compressor rotor disk ("disk") 221 and one or more compressor rotor blades 227. Disks 221 are coupled or welded together when forming the compressor rotor assembly 210. In the embodiment shown, disks 221 are coupled together with curvic teeth 219. Each disk 221 is circumferentially populated with compressor rotor blades 227.

Each disk 221 may include a disk outer surface 229 and a disk sensed feature 228. The disk outer surface 229 is the radially outer surface of the disk 221 and defines a portion of the inner surface of the flow path through the compressor 200. The disk sensed feature 228 may be located on an external surface of the disk 221, such as the disk outer surface 229, and is positioned to be detectable by a rotor sensor 702 (refer to FIG. 3) located in the gas turbine engine 100. The disk sensed feature 228 may be an indentation, a lowered feature relative to an external surface of the disk 221, or a protrusion, a raised feature relative to an external surface of the disk 221.

Each spacer 230 may include a spacer outer surface 239 and a spacer sensed feature 238. The spacer outer surface 239 is the radially outer surface of the spacer 230 and defines a portion of the inner surface of the flow path through the compressor 200. The spacer sensed feature 238 may be located on an external surface of the spacer 230, such as the spacer outer surface 239, and is positioned to be detectable by a spacer sensor 704 (refer to FIG. 3) located in the gas turbine engine 100. As illustrated in FIG. 2, the spacer sensed feature 238 may be circumferentially aligned with the disk sensed feature 228 located on an adjacent disk 221 or may be clocked relative to the disk sensed feature 228 located on an adjacent disk 221.

Rear hub 245 may be located aft of disks 221 and is generally the most aft component of compressor rotor assembly 210. Rear hub 245 may have a disk shape. Shaft interface 248 extends aft from the disk shape of rear hub 245 with a cylindrical shape. Shaft interface 248 may be tapered for coupling to a portion of shaft 120.

Figure 3:
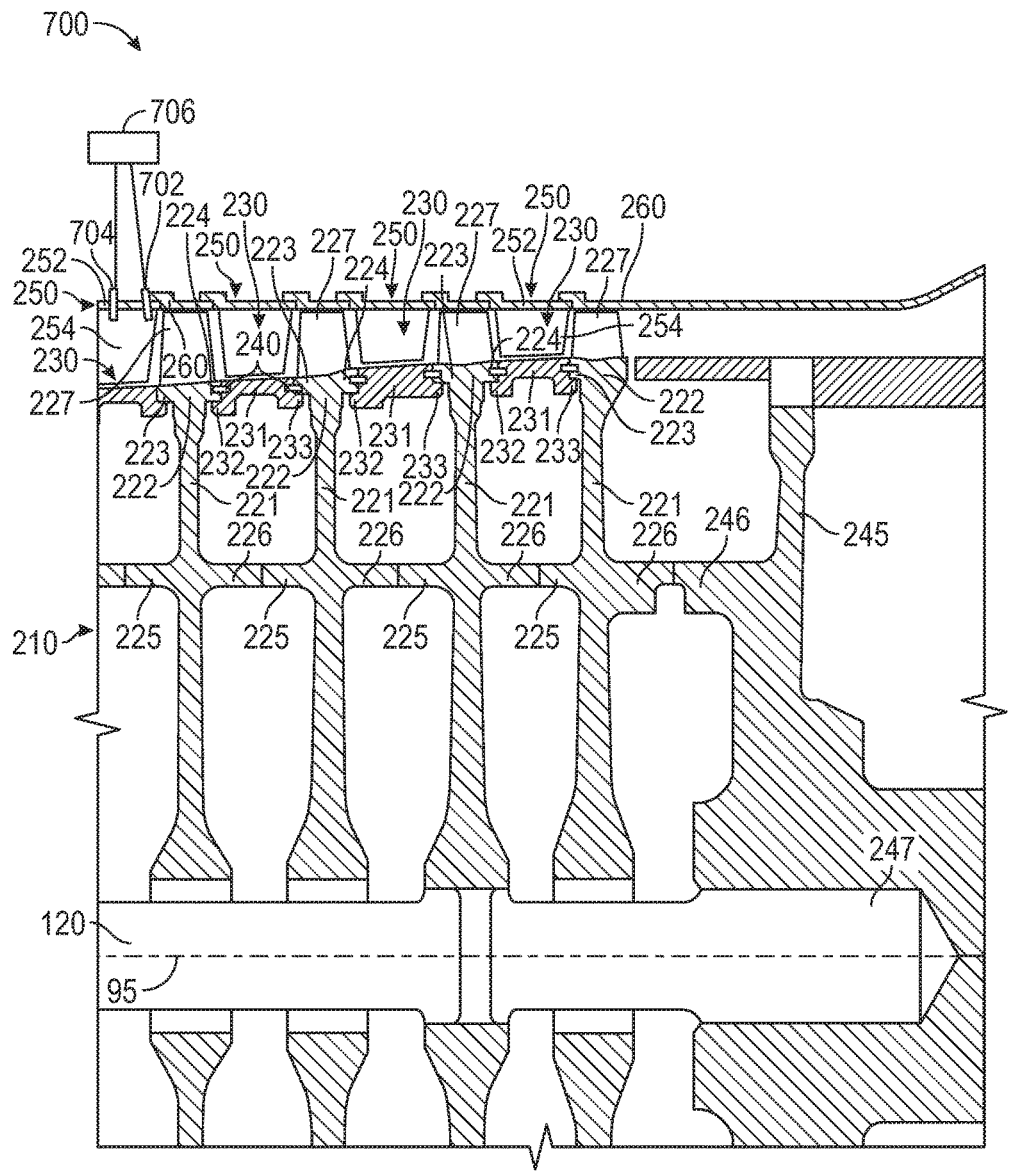
FIG. 3 is a cross-sectional view of a portion of the compressor of FIG. 1.

FIG. 3 is a cross-sectional view of a portion of the compressor 200 of a gas turbine engine which may be used in the gas turbine engine 100 of FIG. 1. Disk 221 of each compressor disk assembly 220 includes a rim 222, a forward arm 225, and an aft arm 226. Rim 222 is located at the radial outermost portion of the disk 221 and may be located at a radially outer circumference of disk 221. In one embodiment rim 222 circumferentially extends completely around disk 221. Generally, each rim 222 includes forward extension 223 extending axially forward and aft extension 224 extending axially aft. In one embodiment both forward extension 223 and aft extension 224 circumferentially extend completely around disk 221.

Forward arm 225 and aft arm 226 are located radially inward from rim 222 and radially outward from the axis of disk 221. Forward arm 225 and aft arm 226 may be used to couple adjacent disks 221 together. In one embodiment forward arm 225 and aft arm 226 circumferentially extend completely around disk 221. Forward arm 225 extends axially forward and aft arm 226 extends axially aft. Each disk 221 couples to an adjacent disk 221. The forward arm 225 of one disk radially aligns with the aft arm of an adjacent disk 221. In one embodiment each forward arm 225 and each aft arm 226 includes curvic teeth 219.

Compressor rotor blades 227 couple to disks 221 at rim 222. Each compressor rotor blade 227 includes a base (not shown) with a retaining feature such as a fir tree or a dovetail. Slots (not shown) in rim 222 have a corresponding retaining feature that secures each compressor rotor blade 227 to disk 221.

Rear hub 245 includes hub arm 246. Hub arm 246 extends axially forward from and extends circumferentially around rear hub 245. Hub arm 246 radially aligns with and is configured to couple to aft arm 226 of the aft most disk 221. In one embodiment hub arm 246 includes curvic teeth 219 to form the coupling between rear hub 245 and the aft most disk 221. Rear hub 245 is configured to form shaft cavity 247. Shaft cavity 247 is a cylindrical cavity at the axis of rear hub 245 configured to receive shaft 120.

Each spacer 230 is shaped generally as a hollow cylinder or annular ring. Spacers 230 span between adjacent disks 221 and couple to adjacent rims 222 with a press fit, slip fit, or interference fit. In one embodiment, the forward end of the spacers 230 couple to an adjacent disk 221 with a slip fit, while the aft end of the spacers 230 couple to an adjacent disk 221 with a press fit. In another embodiment, the forward end of the spacers 230 couple to an adjacent disk 221 with a press fit, while the aft end of the spacers 230 couple to an adjacent disk 221 with a slip fit. Spacers 230 are located radially inward from stators 250.

Each spacer 230 includes a cylindrical body 231, a forward lip 232, and an aft lip 233. Body 231 may be a hollow cylinder or annular ring. Forward lip 232 may extend axially forward from body 231. Forward lip 232 may be an annular flange extending forward from body 231. Aft lip 233 may extend axially aft from body 231 in the direction opposite forward lip 232. Aft lip 233 may be an annular flange extending aft from body 231.

The forward lip 232 may axially overlap with aft extension 224 of an adjacent disk 221 and may be located radially inward from aft extension 224. Forward lip 232 may have a slip fit, a press fit, or an interference fit with aft extension 224. Aft lip 233 may axially overlap with forward extension 223 of an adjacent disk 221 and may be located radially inward from forward extension 223. Aft lip 233 may have a slip fit, press fit, or an interference fit with forward extension 223.

The compressor rotor assembly 210 may also include anti-rotation features 240 installed between spacers 230 and disks 221. Each anti-rotation feature 240 may include pins that protrude axially into rim 222 and into spacer 230, such as into body 231. During operation of the gas turbine engine, particularly during transient operations, the radial fits of the forward and aft ends of each spacer 230 may increase or decrease due to thermal expansion and contraction. Over time the decrease in radial fits may allow circumferential forces to shear the anti-rotation features 240 and to rotate the spacers 230 relative to the disks 221.

Each stator 250 may include a stator shroud 252 and a stator airfoil 254. The stator shroud 252 may generally have the shape of a segment of a hollow cylinder and may be axially aligned with a spacer 230. The stator airfoil 254 may extend radially inward from the stator shroud 252 towards the spacer 230. Stators 250 may be circumferentially aligned and be positioned radially outward from the spacer 230 to form a fluid nozzle between compressor rotor disks 221.

The rotation breakaway detection system 700 may be separate from or may be integrated into the control system of the gas turbine engine 100. The rotation breakaway detection system 700 may include a detector 706, a rotor sensor 702, and a spacer sensor 704. The detector 706 may be located remotely relative to the remainder of the gas turbine engine 100, such as integrated into the gas turbine engine package, on site in the same room, on site in an adjoining room or off site.

The rotor sensor 702 is configured to monitor the rotation of the compressor rotor disk 221. The rotor sensor 702 is positioned within the compressor 200 adjacent to the compressor rotor disk 221. The spacer sensor 704 is configured to monitor the rotation of a spacer 230. The spacer sensor 704 is positioned within compressor adjacent the spacer 230. In the embodiment illustrated, the rotor sensor 702 and the spacer sensor 704 extend through a stator shroud 252 between adjacent stator airfoils 254. Each sensor may be angled towards the rotating element that it is sensing.

Figure 4:
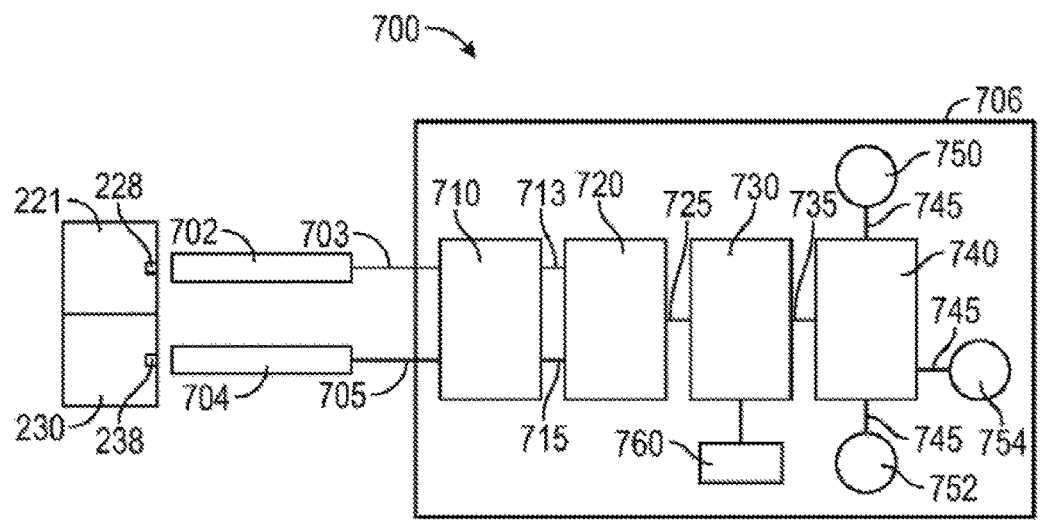
FIG. 4 is a functional block diagram of a rotation breakaway detection system for the gas turbine engine of FIG. 1.

FIG. 4 is a functional block diagram of a rotation breakaway detection system 700 for the gas turbine engine 100 of FIG. 1. The rotor sensor 702 and the spacer sensor 704 may be synchronous pulse output device, such as a proximity sensor, a keyphasor, or an optical sensor. The optical sensor may be a high temperature optical sensor. In embodiments, the rotor sensor 702 and the spacer sensor 704 operate between 10-30 Volts and generate an output signal between 0-5 Volts.

The rotor sensor 702 may be configured to detect the disk sensed feature 228 and output a signal to the detector 706. The rotor sensor 702 may output one pulse for each revolution of the disk 221, determined by the detected disk sensed feature 228. The rotor sensor output signal may be a rectangular wave function. The rotor sensor output signal may be representative of the width (in the direction of rotation) of the disk sensed feature 228, which may be a rectangular feature of the disk 221.

The spacer sensor 704 may be configured to detect the spacer sensed feature 238 and output a signal to the detector 706. The spacer sensor 704 may output one pulse for each revolution of the spacer 230, determined by the detected spacer sense feature 230. The spacer sensor output signal may be a rectangular function. The spacer sensor output signal may be representative of the width of the spacer sensed feature 238, which may be a rectangular feature of the spacer 230.

The detector 706 may include a signal conditioner 710, an offset determinator 720, memory 730, an outputter 740, and multiple output devices 750, 752, and 754. The signal conditioner 710 can be an analog to digital converter and the offset determinator 720, the memory 730, and the outputter 740 can all be implemented in one or more processors.

The signal conditioner 710 receives the rotor sensor output signal from the rotor sensor 702 over a rotor sensor signal connection 703 and the spacer sensor output signal over a spacer sensor signal connection 705. The rotor sensor signal connection 703 and the spacer sensor signal connection 705 may be a wired or a wireless connection.

The signal conditioner 710 then conditions the two signals for the offset determinator 720. The rotor sensor output signal and the spacer sensor output signal may have different timing due to the sensor setup and to the relative positions of the disk sensed feature 228 and the spacer sensed feature

238. The signal conditioner 710 may adjust the timing (e.g., offset) of the two sensor signals, may filter noise from the two sensor signals, and may convert or isolate the two signals to comparison signals (a disk conditioned signal and a spacer conditioned signal), and may send the disk conditioned signal and the spacer conditioned signal to the offset determinator 720. In embodiments, the rotor sensor signal and the spacer sensor signal are analog signals and the signal conditioner 710 converts the signals into a digital format useable by the offset determinator 720.

The offset determinator 720 may receive the disk conditioned signal and the spacer conditioned signal from the signal conditioner 710 over the disk conditioned signal connection 713 and the spacer conditioned signal connection 715 respectively. The offset determinator 720 determines whether the spacer 230 is offset relative to the disk 221 by comparing the timing between the disk conditioned signal and the spacer conditioned signal. If the timing between the disk conditioned signal and the spacer condition signal exceeds a predetermined threshold, the spacer 230 is considered offset relative to the disk 221. The predetermined threshold may correlate to a predetermined amount of circumferential rotation of the spacer 230 relative to the disk 221 from an initial position of the spacer 230 relative to the disk 221

The predetermined amount may be an amount of relative rotation that can result in binding of the compressor 200 upon start-up of the gas turbine engine 100, can result is significant rubbing between components of the compressor 200, can result in a significant imbalance of the compressor rotor assembly 210, or signifies that anti-rotation features 240 may be considered broken. In embodiments, the predetermined threshold amount may be or correspond to half the width or thickness of an anti-rotation feature 240.

In some embodiments, the predetermined threshold may vary based on the rotational speed of the disk 221 and the spacer 230. Since changing the speed of the shaft 120 driving the disk 221 and the spacer 230 will change the timing between the detection of the disk sensed feature 228 and the spacer sensed feature 238, the offset determinator 720 may adjust the threshold amount based on the speed of the shaft 120 to account for the timing change. Similarly, the signal conditioner 710 may vary the alignment adjustment for the first pulse and the second pulse to account for the change in speed of the shaft 120.

In some embodiments, the width of the output pulses in the disk conditioned signal and the spacer conditioned signal may represent the predetermined threshold amount. In these embodiments, an offset of the spacer 230 relative to the disk 221 may be detected when the output pulses no longer overlap.

The memory 730 may receive the comparison output signal from the offset determinator 720 over a comparison signal connection 725. The memory 730 may have self-latch memory logic. The memory 730 may be used to store that an offset has occurred. It may be desirable to maintain that the offset occurred even if the offset condition is no longer true. For example, when the offset condition is used to determine that the anti-rotation features 240 have broken, the fact that the relative positions have changed to be within the threshold amount does not change the fact that the anti-rotation features 240 are broken. The memory 730 may hold the output value that signifies that the offset condition occurred until it is reset. The reset 760 may be configured to clear the memory 730.

In embodiments, the memory 730 may also be used to synchronize the timing of the rotor sensor signal and the spacer sensor signal, and in particular the output pulses in the sensor signals.

The outputter 740 may obtain the determination of whether the offset has occurred from the memory 730 or may obtain the comparison signal from the offset determinator 720. The outputter 740 may send the signal to or activate one or more output devices 750, 752, 754, such as a light, a buzzer, a siren, and a data logger. In the embodiment illustrated, the detector 706 includes a first output device 750, a second output device 752, and a third output device 754.

Figure 5:
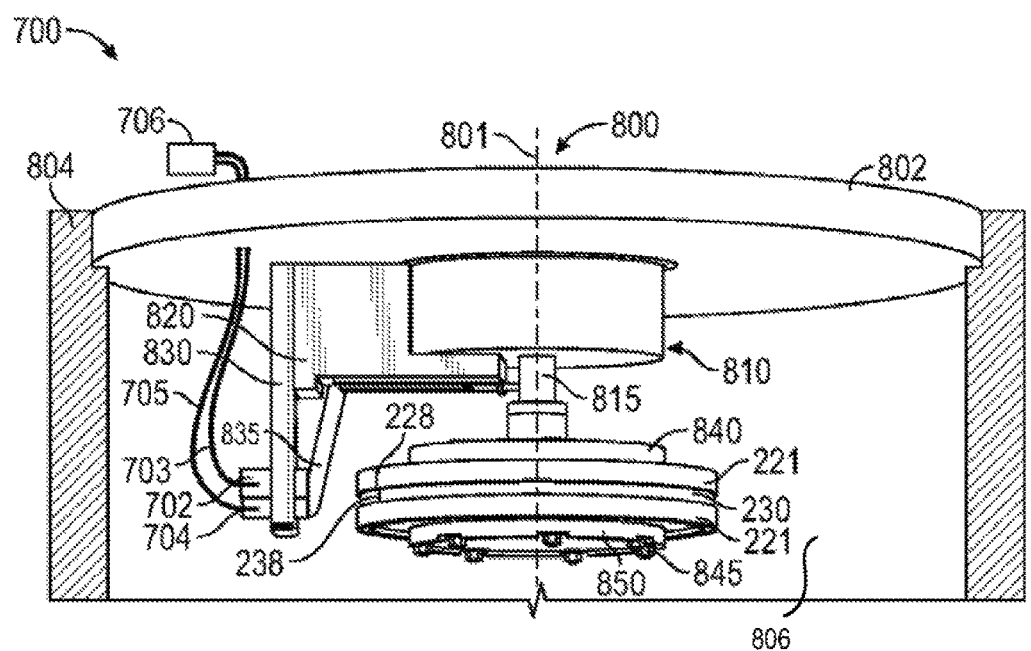
FIG. 5 is a perspective view of a spin pit including the rotation breakaway detection system of FIG. 4 with a portion of the pit wall 804 cut away.

FIG. 5 is a perspective view of a spin pit 800 including the rotation breakaway detection system 700 of FIG. 4 with a portion of the pit wall 804 cut away. The spin pit 800 may include a pit wall 804, a top plate 802, a pit motor 810, a pit shaft 815, a pit control system 820, a first bracket 830, a second bracket 835, a top arbor 840, a bottom arbor 850, and fasteners 845. The pit wall 804 forms a pit cavity 806. In the embodiment illustrated, the pit wall 804 has a cylindrical shape and the pit cavity 806 is a cylinder. The top plate 802 is located at the top of the pit wall 804 and encloses the pit cavity 806 during operation of the spin pit 800. In the embodiment illustrated, the top plate 802 has a disk shape with a diameter that is slightly larger than that of the pit cavity 806. The top plate 802 may be configured to lift up out of the cavity when the spin pit 800 is not in operation. This may provide access to the various components of the spin pit 800 and to the test components, such as one or more spacers 230 and one or more disks 221.

The pit motor 810 may be affixed to the top plate 802. The pit shaft 815 extends down from the pit motor 810. The pit motor 810 is configured to drive the pit shaft 815 at one or more pre-selected speeds depending on the desired test conditions. The pit shaft 815 may be supported by the pit motor 810, by the top plate 802 or by other support mechanisms.

The pit control system 820 may be located adjacent the pit motor 810. The pit control system 820 may include sensors for monitoring the rotational speed of the pit shaft 815. The pit control system 820 may be coupled to the top plate 802.

The top arbor 840, the bottom arbor 850, and the fasteners 845 may secure the test components to the pit shaft 815. The top arbor 840 may be affixed to the pit shaft 815. The fasteners 845 may secure the bottom arbor 850 to the top arbor 840. The fasteners 845 may secure the test components between the top arbor 840 and the bottom arbor 850. In embodiments, the bottom arbor 850 may be removed, which allows the test components to be located adjacent and below the top arbor 840. The bottom arbor 850 may then be located below the test components. The fasteners 845 may couple the test components to and between the top arbor 840 and the bottom arbor 850. The coupling may simulate the coupling of the disks 221 and spacers 230 within the compressor rotor assembly 210.

The pit motor 810, the pit shaft 815, the top arbor 840, the bottom arbor 850, and the test components may be axially aligned as illustrated by pit reference line 801. In the embodiment illustrated, the top plate 802 and the pit wall 804 are also axially aligned with the pit motor 810, the pit shaft 815, the top arbor 840, the bottom arbor 850, and the test components. The pit motor 810, the pit shaft 815, the pit control system 820, the first bracket 830, the top arbor 840, and the bottom arbor 850 may be located within the pit cavity 806 during operation of the spin pit 800 and may be lifted out of the pit cavity 806 by the top plate 802 when the spin pit 800 is not in operation.

The rotor sensor 702 and the spacer sensor 704 may also be located within the pit cavity 806 during operation of the spin pit 800. The rotor sensor 702 and the spacer sensor 704 are positioned to detect the disk sensed feature 228 and the spacer sensed feature 238 respectively. In the embodiment illustrated, the first bracket 830 may be coupled to a side of the pit control system 820 and extend down away from the top plate 802. In this embodiment, the rotor sensor 702 and the spacer sensor 704 are coupled to the first bracket 830. The rotor sensor 702 and the spacer sensor 704 may be adjacent to the disk 221 and the spacer 230 being tested. The exact proximity of the rotor sensor 702 and the spacer sensor 704 to the disk 221 and spacer 230 may depend on the type of sensors being used.

A second bracket 835 may attach to an end of the first bracket 830 distal to the top plate 802. The second bracket 835 may extend toward the top plate and toward the pit shaft 815, and may couple to the pit control system 820 between the first bracket 830 and the pit shaft 815.

While the various embodiments disclosed herein describe the use of a rotor sensor 702 and a spacer sensor 704, any number of rotor sensors 702 and spacer sensors 704 may be used depending on the number of disks 221 and spacers 230 that are being monitored by the rotation breakaway detection system 700.

One or more of the above components (or their subcomponents) may be made from stainless steel and/or durable, high temperature materials known as "superalloys". A superalloy, or high-performance alloy, is an alloy that exhibits excellent mechanical strength and creep resistance at high temperatures, good surface stability, and corrosion and oxidation resistance. Superalloys may include materials such as HASTELLOY, INCONEL, WASPALOY, RENE alloys, HAYNES alloys, INCOLOY, MP98T, TMS alloys, and CMSX single crystal alloys.

INDUSTRIAL APPLICABILITY

Gas turbine engines may be suited for any number of industrial applications such as various aspects of the oil and gas industry (including transmission, gathering, storage, withdrawal, and lifting of oil and natural gas), the power generation industry, cogeneration, aerospace, and other transportation industries.

Referring to FIG. 1, a gas (typically air 10) enters the inlet 110 as a "working fluid", and is compressed by the compressor 200. In the compressor 200, the working fluid is compressed in an annular flow path 115 by the series of compressor disk assemblies 220. In particular, the air 10 is compressed in numbered "stages", the stages being associated with each compressor disk assembly 220. For example, "4th stage air" may be associated with the 4th compressor disk assembly 220 in the downstream or "aft" direction, going from the inlet 110 towards the exhaust 500). Likewise, each turbine disk assembly 420 may be associated with a numbered stage.

Once compressed air 10 leaves the compressor 200, it enters the combustor 300, where it is diffused and fuel is added. Air 10 and fuel are injected into the combustion chamber 390 via injector 310 and combusted. Energy is extracted from the combustion reaction via the turbine 400 by each stage of the series of turbine disk assemblies 420. Exhaust gas 90 may then be diffused in exhaust diffuser 510, collected and redirected. Exhaust gas 90 exits the system via an exhaust collector 520 and may be further processed (e.g., to reduce harmful emissions, and/or to recover heat from the exhaust gas 90).

Gas turbine engines operate at high temperatures and pressures. During operation of gas turbine engines the components of gas turbine engines thermally expand. This thermal expansion may result in stresses and strains within the components and may result in separation of adjacent components. The stresses, strains, and potential for separation between components are highest during the transients of gas turbine engines and more particularly occur during the start-up or shut down of a gas turbine engine.

During start-up or shut down components may thermally expand or contract at a different rate due to the geometry of the component, the coefficient of thermal expansion of the material of the component, and the location of the component within the gas turbine engine which results in separation of the components. Some components may be assembled with an interference fit and may have a loss of pilot during thermal expansion or contraction.

One such instance may occur within the compressor 200. The spacers 230 may thermally contract faster than the disks 221 during shut down of the gas turbine engine 100. The interference fit between the spacers 230 and disks 221 may be lost during shut down and the spacers 230 may rotate circumferentially relative to the disks 221. Over time, the spacers 230 may be clocked relative to the disks 221 beyond a threshold that results in the compressor 200 binding and preventing rotation of the shaft 120 during start-up.

Anti-rotation features 240 may be used to prevent the spacers 230 from clocking relative to the disks 221 during transient operations. In the course of engine cycling, the interference fit is lost and the anti-rotation features 240 assume the load. Once the anti-rotation features 240 are broken from repeated load cycling, a spacer 230 may begin to rotate relative to an adjacent disk 221 during each engine cycle. This rotation may result in an imbalance of the rotor and may result in rubbing between the spacers 230 and the stators 250. The rubbing between components and the imbalance of the compressor rotor assembly 210 may result in binding of the compressor 200, which may prevent the shaft 120 from rotating.

The rotation breakaway detection system 700 may be configured to operate with the gas turbine engine 100 to detect the relative displacement between the spacers 230 and their adjacent disks 221. Once the relative displacement reaches a pre-determined threshold where there is a potential for a significant amount of rubbing, for a significant imbalance, or for binding within the compressor 200, the rotation breakaway detection system 700 may issue an alert to an operator, owner, or engineer.

The rotation breakaway detection system 700 may also be configured to operate with the spin pit 800 to determine how many cycles it may take for a spacer 230 to rotate relative to an adjacent disk 221 beyond the pre-determined threshold. The rotation beyond the pre-determined threshold may signify that the anti-rotation features 240 have failed. Determining the number of cycles to failure may allow an engineer to make design to design comparisons and may help an engineer determine whether a particular configuration of a disk 221, a spacer 230, and anti-rotation features 240 may be used within the gas turbine engine 100.

Figure 6:
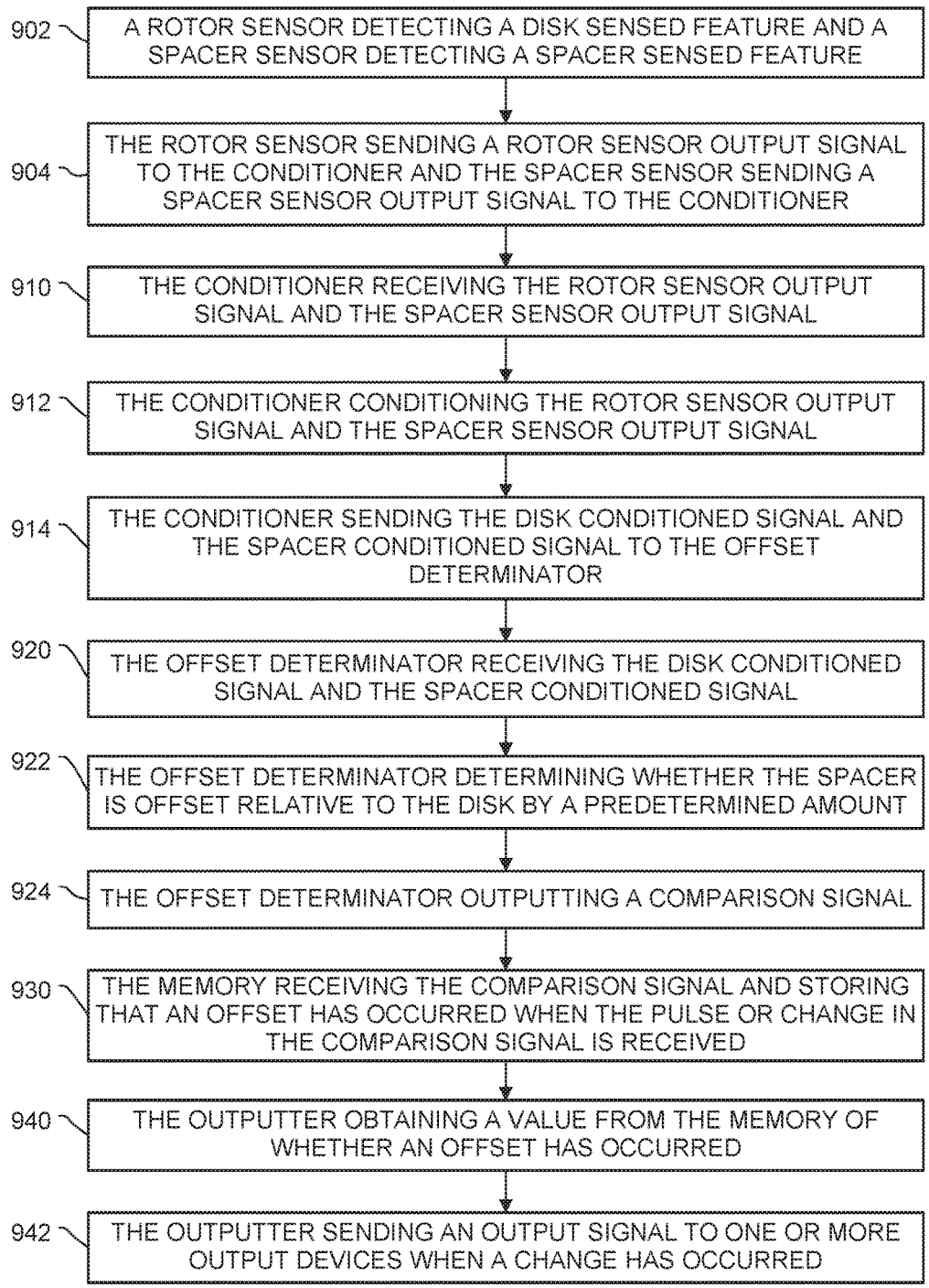
FIG. 6 is a flowchart of a method for detecting the rotation breakaway of a compressor spacer from a compressor disk.

FIG. 6 is a flowchart of a method for detecting the rotation breakaway of a spacer 230 from a disk 221 in real time. The method can be implemented, for example, using the systems depicted in FIGS. 4 and 5. The method includes a rotor sensor 702 detecting a disk sensed feature 228 and a spacer sensor 704 detecting a spacer sensed feature 238 at step 902.

The method also includes the rotor sensor 702 sending a rotor sensor output signal to the signal conditioner 710 and the spacer sensor 704 sending a spacer sensor output signal to the signal conditioner 710 at step 904. Step 904 may include the rotor sensor 702 sending a pulse to the signal conditioner 710 each time the rotor sensor 702 detects the disk sensed feature 228 and the spacer sensor 704 sending a pulse to the signal conditioner 710 each time the spacer sensor 704 detects the spacer sensed feature 238.

The method further includes the signal conditioner 710 receiving the rotor sensor output signal and the spacer sensor output signal at step 910. The method yet further includes the signal conditioner 710 conditioning the rotor sensor output signal and the spacer sensor output signal at step 912.

Step 912 may include adjusting the timing of the two sensor signals including the conditioned output pulses, so that the pulses within the two signals are aligned when the disk 221 and spacer 230 are in an initial state, such as in their initial assembled state where the disk 221 and the spacer 230 are considered aligned. Step 912 may also include filtering the noise from the two sensor signals. Step 912 may further include converting the rotor sensor output signal and the spacer sensor output signal to a disk conditioned signal and a spacer conditioned signal respectively. The disk conditioned signal and the spacer conditioned signal may be signals converted or isolated to fit the logic used in the offset determinator 720, such as real time logic or CMOS (complementary metal oxide semiconductor) logic.

The method still further includes the signal conditioner 710 sending the disk conditioned signal and the spacer conditioned signal to the offset determinator 720 at step 914. Step 914 may include outputting a conditioned output pulse for each of the pulses received from the two sensors The method also includes the offset determinator 720 receiving the disk conditioned signal and the spacer conditioned signal at step 920. The method further includes the offset determinator 720 determining whether the spacer 230 is offset relative to the disk 221 by a predetermined amount at step 922. In some embodiments, the predetermined amount is selected based on the size and properties of the anti-rotation features 240, such as the minimum amount of rotational displacement that can only occur if the anti-rotation features 240 are broken. In other embodiments, the predetermined amount is selected based on how much rotation can occur before significant amounts of rubbing between the spacer 230 and the stators 250 can occur, a significant imbalance of the compressor rotor assembly 210 can occur, binding can occur, or a combination thereof can occur. Step 922 may include comparing the timing between the disk conditioned signal and the spacer conditioned signal, such as comparing the timing of the pulses within the signals. If the time between the two pulses changes by or exceeds a predetermined threshold then the spacer 230 may be considered offset, i.e. misaligned and broken away, from the disk 221.

The method yet further includes the offset determinator 720 outputting a comparison signal at step 924. When the angular position of the spacer 230 is offset relative to that of the disk 221 by the predetermined amount, the offset determinator 720 may output a single pulse when the threshold is crossed or may change the signal until the threshold is no longer exceeded.

The method also includes the memory 730 receiving the comparison signal and storing that an offset has occurred when the pulse or change in the comparison signal is received, such as by a self-latch memory logic, at step 930. The memory 730 may store that an offset has occurred until the memory receives a reset signal from a reset module 760.

The method still further includes the outputter 740 obtaining a value from the memory 730 of whether an offset has occurred at step 940. The method also includes the outputter 740 sending an output signal to one or more output devices when a change has occurred at step 942. Output devices, such as alarms, lights, etc., may be activated by the outputter 740 and may remain active until the memory 730 is reset. Other output devices, such as a high speed recorder, may provide the data to a remote management system that may send an alert to an owner, operator, or engineer that is off site.

In embodiments, the method includes installing the compressor rotor disk 221, the spacer 230, and anti-rotation features 240 into a spin pit 800 between a top arbor 840 and a bottom arbor 850, each of the anti-rotation features 240 extending the compressor rotor disk and the spacer. In these embodiments, the method also includes the pit shaft 815 rotating the disk 221 and the spacer 230 and cycling the spin pit between two states to simulate multiple gas turbine engine cycles and counting the number of cycles until the predetermined threshold is exceeded. Exceeding the predetermined threshold signifies that the plurality of anti-rotation features 240 have broken. Counting the number of cycles may help an engineer determine the fatigue life of the anti-rotation pins and may help an engineer test and compare multiple configurations.

In embodiments, the disk 221 and the spacer 230 are installed in compressor rotor assembly 210 of the gas turbine engine 100. In these embodiments, the method includes monitoring the relative positions of the disk 221 and the spacer 230 during operation of the gas turbine engine, while the shaft 120 rotates the disk 221 and the spacer 230. The predetermined amount may be set to occur prior to where significant rubbing between the spacer 230 and stators 250 can occur, a significant imbalance of the compressor rotor assembly 210 can occur, and binding of the compressor rotor assembly 210 within the gas turbine engine 100 can occur.

Those of skill will appreciate that the various illustrative functional blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the design constraints imposed on the overall system. Skilled persons can implement the described functionality in varying ways for each particular application, but such implementation decisions should not be interpreted as causing a departure from the scope of the invention. In addition, the grouping of functions within a module, block, or step is for ease of description. Specific functions or steps can be moved from one module or block without departing from the invention.

The various illustrative logical blocks and modules described in connection with the embodiments disclosed herein can be implemented or performed with a general purpose processor, a digital signal processor (DSP), application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module executed by a processor (e.g., of a computer), or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art.

What is claimed is:

1. A method for detecting a rotation breakaway of a spacer from a compressor rotor disk of a gas turbine engine, the method comprising:
   detecting a disk sensed feature located on the compressor rotor disk and a spacer sensed feature located on the spacer;
   outputting a rotor sensor output signal and a spacer sensor output signal;
   receiving the rotor sensor output signal and the spacer sensor output signal, and converting the rotor output signal to a disk conditioned signal and the spacer output signal to a spacer conditioned signal including filtering noise from the rotor sensor output signal and the spacer output signal;
   outputting the disk conditioned signal and the spacer conditioned signal;
   receiving the disk conditioned signal and the spacer conditioned signal, determining whether the spacer is offset relative to the disk by a predetermined amount by comparing a timing of the disk conditioned signal and the spacer conditioned signal, and outputting a comparison signal;
   receiving the comparison signal and storing that the offset has occurred when a change in the comparison signal is received; and
   obtaining a value of whether the offset has occurred, and sending an output signal to an output device when the change has occurred; and
   wherein outputting the rotor sensor output signal includes sending a first pulse each time the rotor sensed feature is detected and outputting the spacer sensor output signal includes sending a second pulse each time the spacer sensed feature is detected, wherein outputting the disk conditioned signal includes sending a first conditioned pulse each time the first pulse is received and outputting the spacer conditioned signal includes sending a second conditioned pulse each time the second pulse is received; and the method further comprises adjusting a timing of the spacer conditioned signal relative to the disk conditioned signal so that the first conditioned pulse and the second conditioned pulse are aligned when the compressor rotor disk and the spacer are in an initial state.

2. The method of claim 1, wherein comparing the timing of the disk conditioned signal and the spacer conditioned signal includes determining whether the timing between the first conditioned pulse and the second conditioned pulse exceeds a predetermined threshold.

3. The method of claim 2, wherein an anti-rotation feature extends into the compressor rotor disk and the spacer, and wherein exceeding the predetermined threshold signifies that the anti-rotation feature is broken.

4. The method of claim 3, wherein the predetermined amount is half a width of the anti-rotation feature.

5. The method of claim 2, wherein the predetermined threshold varies based on a rotational speed of a shaft rotating the compressor rotor disk and the spacer.

6. The method of claim 2, further comprising:
   installing the compressor rotor disk, the spacer, and a plurality of anti-rotation pins into a spin pit between a top arbor and a bottom arbor, each of the plurality of anti-rotation pins extending into the compressor rotor disk and the spacer; and
   cycling the spin pit between two states to simulate multiple gas turbine engine cycles and counting a number of cycles until the predetermined threshold is exceeded.

7. The method of claim 1, wherein the compressor rotor disk and the spacer are installed in a compressor rotor assembly of the gas turbine engine, wherein the method further includes monitoring relative positions of the compressor rotor disk and the spacer during operation of the gas turbine engine and wherein the predetermined amount is set to occur prior to where significant rubbing between the spacer and compressor stationary vanes can occur, a significant imbalance of the compressor rotor assembly can occur, and binding of the compressor rotor assembly within the gas turbine engine can occur.

8. A method for detecting a rotation breakaway of a spacer from a compressor rotor disk of a gas turbine engine using a rotation breakaway system including a rotor sensor, a spacer sensor, a signal conditioner, an offset determinator, a memory, and an outputter, the spacer including a spacer sensed feature detectable by the spacer sensor and the compressor rotor disk including a disk sensed feature detectable by the rotor sensor, the method comprising:
   a shaft rotating the compressor rotor disk and the spacer;
   the rotor sensor detecting the disk sensed feature during each revolution of the compressor rotor disk and the spacer sensor detecting the spacer sensed feature during each revolution of the spacer;
   the rotor sensor outputting a rotor sensor output signal including outputting a first pulse each time the disk sensed feature is detected and the spacer sensor outputting a spacer sensor output signal including outputting a second pulse each time the spacer sensed feature is detected;
   the signal conditioner receiving the rotor sensor output signal and the spacer sensor output signal;

the signal conditioner adjusting the timing of the rotor output signal and the spacer output signal so that the first pulse and the second pulse are aligned when the compressor rotor disk and the spacer are in an initial state, and converting the rotor output signal to a disk conditioned signal and the spacer output signal to a spacer conditioned signal;

the signal conditioner outputting the disk conditioned signal including a first conditioned pulse correlating to the first pulse and the spacer conditioned signal including a second conditioned pulse correlating to the second pulse;

the offset determinator receiving the disk conditioned signal and the spacer conditioned signal;

the offset determinator determining whether an offset between the spacer and the compressor rotor disk has occurred by comparing the timing between the first conditioned pulse and the second conditioned pulse to a predetermined threshold;

the offset determinator outputting a comparison signal and changing the output of the comparison signal when the timing between the first conditioned pulse and the second conditioned pulse exceeds the predetermined threshold;

the memory receiving the comparison signal and storing that the offset has occurred when a change in the comparison signal is received;

the outputter obtaining a value from the memory of whether the offset has occurred; and the outputter sending an output signal to an output device when the change has occurred.

9. The method of claim 8, wherein conditioning the rotor output signal and the spacer output signal includes filtering noise from the rotor sensor output signal and the spacer output signal.

10. The method of claim 8, wherein an anti-rotation feature extends into the compressor rotor disk and the spacer, and wherein the timing between the first conditioned pulse and the second conditioned pulse exceeding the predetermined threshold signifies that the anti-rotation feature is broken.

11. The method of claim 10, wherein the predetermined threshold correlates to a predetermined amount of circumferential rotation of the spacer relative to the compressor rotor disk from an initial position of the spacer relative to the compressor rotor disk, and wherein the predetermined amount corresponds to half the width of the anti-rotation feature.

12. The method of claim 8, wherein the predetermined threshold varies based on a rotational speed of shaft rotating the compressor rotor disk and the spacer.

13. The method of claim 8, wherein the shaft rotating the compressor rotor disk and the spacer includes cycling between two states to simulate multiple gas turbine engine cycles, the method further comprising:

installing the compressor rotor disk, the spacer, and a plurality of anti-rotation pins into a spin pit between a top arbor and a bottom arbor, the top arbor and the bottom arbor coupling the compressor rotor disk and the spacer to the shaft, each of the plurality of anti-rotation pins extending into the compressor rotor disk and into the spacer; and counting a number of cycles until the predetermined threshold is exceeded.

14. The method of claim 8, wherein the predetermined threshold correlates to a predetermined amount of circumferential rotation of the spacer relative to the compressor rotor disk from an initial position of the spacer relative to the compressor rotor disk and the compressor rotor disk and the spacer are installed in a compressor rotor assembly of the gas turbine engine, wherein the method further includes monitoring relative positions of the compressor rotor disk and the spacer during operation of the gas turbine engine, and wherein the predetermined amount is set to occur prior to where significant rubbing between the spacer and compressor stationary vanes can occur, a significant imbalance of the compressor rotor assembly can occur, and binding of the compressor rotor assembly within the gas turbine engine can occur.

15. A rotation breakaway detection system for detecting a misalignment of a spacer and a compressor rotor disk for a gas turbine engine compressor, the spacer including a spacer sensed feature and the compressor rotor disk including a disk sensed feature, the rotation breakaway detection system comprising:

a rotor sensor that detects the disk sensed feature when the compressor rotor disk is rotating and outputs a rotor sensor signal including a first pulse each time the disk sensed feature is detected;

a spacer sensor that detects the spacer sensed feature when the spacer is rotating and outputs a spacer sensor signal including a second pulse each time the spacer sensed feature is detected;

a signal conditioner that receives the rotor sensor signal and the spacer sensor signal, and conditions the rotor output signal and the spacer output signal by adjusting the timing of the rotor output signal and the spacer output signal so that the first pulse and the second pulse are aligned when the compressor rotor disk and the spacer are in an initial state and converting the rotor output signal to a disk conditioned signal and the spacer output signal to a spacer conditioned signal, the signal conditioner outputs the disk conditioned signal including a first conditioned pulse correlating to the first pulse and the spacer conditioned signal including a second conditioned pulse correlating to the second pulse;

an offset determinator that receives the disk conditioned signal and the spacer conditioned signal, determines whether an offset between the spacer and the compressor rotor disk has occurred by comparing the timing between the first conditioned pulse and the second conditioned pulse to a predetermined threshold, and outputs a comparison signal, changing the output of the comparison signal when the timing between the first conditioned pulse and the second conditioned pulse exceeds the predetermined threshold;

a memory that receives the comparison signal and stores that the offset has occurred when a change in the comparison signal is received; and an outputter that obtains a value from the memory of whether the offset has occurred and sends an output signal to an output device when the change has occurred.

16. The rotation breakaway detection system of claim 15, wherein an anti-rotation feature extends into the compressor rotor disk and the spacer, and wherein the timing between the first conditioned pulse and the second conditioned pulse exceeding the predetermined threshold signifies that the anti-rotation feature is broken.

17. The rotation breakaway detection system of claim 15, wherein the predetermined threshold varies based on a rotational speed of shaft rotating the compressor rotor disk and the spacer.

18. A gas turbine engine including the rotation breakaway detection system of claim 15, wherein the spacer and the compressor rotor disk are coupled within a compressor rotor assembly, and the rotor sensor and the spacer sensor are located within the gas turbine engine, wherein the predetermined threshold correlates to a predetermined amount of circumferential rotation of the spacer relative to the compressor rotor disk from an initial position of the spacer relative to the compressor rotor disk, and wherein the predetermined amount is set to occur prior to where significant rubbing between the spacer and compressor stationary vanes can occur, a significant imbalance of the compressor rotor assembly can occur, and binding of the compressor rotor assembly within the gas turbine engine can occur.

19. A spin pit including the rotation breakaway detection system of claim 15, the spin pit further comprising a pit wall forming a pit cavity, a pit shaft extending in the pit cavity, a top arbor, a bottom arbor, and a plurality of anti-rotation pins, wherein the compressor rotor disk and the spacer are coupled to the pit shaft between the top arbor and the bottom arbor, wherein each of the plurality of anti-rotation pins extend into the compressor rotor disk and into the spacer, wherein the pit shaft rotates the compressor rotor disk and the spacer, cycling between two states to simulate multiple gas turbine engine cycles until the predetermined threshold is exceeded, and wherein the rotation breakaway detection system counts a number of cycles until the predetermined threshold is exceeded.

* * * * *